United States Patent [19]

Jacko et al.

[11] Patent Number: 5,339,931
[45] Date of Patent: Aug. 23, 1994

[54] POROUS COPPER POWDER MODIFIED FRICTION MATERIAL

[75] Inventors: Michael G. Jacko, Southfield; Peter H. Tsang, West Bloomfield; Seong K. Rhee, Northville, all of Mich.

[73] Assignee: Allied-Signal Inc., Morristown, N.J.

[21] Appl. No.: 57,932

[22] Filed: May 7, 1993

[51] Int. Cl.$^5$ .............................................. F16D 69/00
[52] U.S. Cl. .................................. 188/251 M; 106/36
[58] Field of Search ............. 188/251 M, 251 A, 73.1; 192/107 M; 51/309; 106/36

[56] References Cited

U.S. PATENT DOCUMENTS 4,175,070  11/1979  Klein ........................................ 106/36
5,217,528   6/1993  Seki ......................................... 106/36

Primary Examiner—Robert J. Oberleitner
Assistant Examiner—Clifford T. Bartz
Attorney, Agent, or Firm—Leo H. McCormick, Jr.; Larry J. Palguta

[57] ABSTRACT

Friction material pads for use in a brake system with an aluminum-metal matrix composite rotor wherein a brake application can create operational temperatures that approach 450C. The formulation of the composition for the friction pads is generically a basic non-asbestos organic formula modified to include a high abrasive content, solid lubricant package, and a porous copper powder. The porous copper powder which makes up from 2-18 percent by weight the friction pads has a nominal diameter of 0.20 mm. The porous copper powder proportionally responds to temperature and mechanical forces generated during a brake application by deforming and smearing to aid in the formation of a glaze between the engaging surfaces of the friction pads and aluminum-metal matrix composite rotor. This glaze prevents scoring of the aluminum-based rotor while at the same time maintaining a substantial stable coefficient of friction of approximately 0.4 during brake applications over a wide range of speeds and deceleration rates.

7 Claims, 11 Drawing Sheets

| Ingredient | BL$_1$ | BL$_2$ | A | B | C | D | E | F | G | H | Range |
|---|---|---|---|---|---|---|---|---|---|---|---|
| Phenolic Resin | 8 | 12 | 11 | 11 | 11 | 11 | 11 | 9 | 10 | 10 | 8-15 |
| Organic Fm Mod. | 2 | 10 | 13 | 9 | 7 | 7 | 7 | 5 | 8 | 8 | 5-12 |
| Organic Fiber | 10 | 5 | 4 | 3 | 2 | 2 | 2 | 2 | 2 | 2 | 2-5 |
| Carbon/Graphite | 15 | 5 | 7 | 6 | 10 | 6 | 6 | 5 | 5 |  | 4-14 |
| Glassy Fiber |  | 5 | 7 | 13 | 10 | 16 | 14 | 9 | 13 | 13 | 4-20 |
| Inorganic Fm Mod. | 10 | 43 | 54 | 57 | 38 | 54 | 46 | 44 | 42 | 38 | 36-60 |
| Abrasive Part. |  |  | 4 | 1 | 18 |  |  |  | 5 | 6 | 2-12 |
| Lubricants |  |  |  |  | 4 | 4 | 4 | 3 | 4 | 4 | 2-8 |
| METAL FORMS: |  |  |  |  |  |  |  |  |  |  |  |
| Sponge Iron/Steel Fiber | 55 |  |  |  |  |  |  | (18) |  |  |  |
| Porous CopperPowder |  |  |  |  |  |  | 10 | 18 | 11 | 14 | 2-18 |
| Copper Fiber |  | 20 |  |  |  |  |  | (18) |  |  |  |

| Ingredient | BL₁ | BL₂ | A | B | C | D | E | F | G | H | Range |
|---|---|---|---|---|---|---|---|---|---|---|---|
| Phenolic Resin | 8 | 12 | 11 | 11 | 11 | 11 | 11 | 9 | 10 | 10 | 8-15 |
| Organic Fm Mod. | 2 | 10 | 13 | 9 | 7 | 7 | 7 | 5 | 8 | 8 | 5-12 |
| Organic Fiber | 10 | 5 | 4 | 3 | 2 | 2 | 2 | 2 | 2 | 2 | 2-5 |
| Carbon/Graphite | 15 | | 7 | 6 | 10 | 6 | 6 | 5 | 5 | | 4-14 |
| Glassy Fiber | | 5 | 7 | 13 | 10 | 16 | 14 | 9 | 13 | 13 | 4-20 |
| Inorganic Fm Mod. | 10 | 43 | 54 | 57 | 38 | 54 | 46 | 44 | 42 | 38 | 36-60 |
| Abrasive Part. | | | 4 | 1 | 18 | | | | 5 | 6 | 2-12 |
| Lubricants | | | | | 4 | 4 | 4 | 3 | 4 | 4 | 2-8 |
| METAL FORMS: | | | | | | | | | | | |
| Sponge Iron/Steel Fiber | 55 | | | | | | | (18) | | | |
| Porous CopperPowder | | | | | | | 10 | 18 | 11 | 14 | 2-18 |
| Copper Fiber | | 20 | | | | | | (18) | | | |

POROUS COPPER POWDER MODIFIED FRICTION MATERIAL

This invention relates to a friction pad for a brake system having aluminum-based rotors wherein friction stability and wear are enhanced through the use of porous copper powder which smears and reacts to form a surface glaze to protect the aluminum rotors from scoring and excessive wear during a brake application when either low or high temperature is generated.

Efforts have been made to increase the overall operating efficiency of vehicles powered with internal combustion engines by reducing the overall weight of vehicles through the use of lighter weight materials such as fiberglass and aluminum panels, plastic moldings, rubber bumpers, carbon structural members, and aluminum-based calipers, and rotors in brake systems. Normally the lightweight materials can be directly substituted for the components in the vehicle. Unfortunately in brake systems, the same composition of materials used to manufacture friction pads for use with cast iron rotors can not be used with aluminum-based rotors because the abrasive materials in such friction pads often score an aluminum-based rotor and a stable coefficient of friction is not achieved.

Rotors made of such aluminum or aluminum alloys have been evaluated in the past for use as rotors in brake systems. Unfortunately, such aluminum-based materials often soften and become weak during use, and as a result are not commonly used in a braking system except as bicycle rims against which soft rubber-based materials rub under low energy absorption conditions. Development of new materials known as aluminum-metal-matrix composites (Al-MMC) are type of aluminum alloy with either particulate or fibrous reinforcement have occurred which significantly increases the strength and hardness of a base aluminum alloy. The most common reinforcement for such an alloy is achieved through the addition of from 10 to 60 volume percent fine silicon carbide, although alumina and other ceramics may also be used. A known Al-MMC rotor, which contains 20% SiC, is thermally treated to increase the Rockwell B hardness to be between 40 and 80. This Al-MMC rotor retains high thermal conductivity, hardness, and strength when exposed to high temperatures during a brake application.

Attempts have been made to achieve compatibility between friction pads and an aluminum-based rotor such as the application of a wear resistant surface coating to the rubbing surface of an aluminum rotor to achieve a desired brake coefficient of friction while at the same time preventing deterioration of the aluminum-based rotor as disclosed in U.S. Pat. No. 4,290,510. This type of protection would appear to be acceptable in brake systems wherein the thermal energy generated during a brake application is below 482° C., however, the added cost and need to replace the coating after a period of use may prevent acceptance from the general public.

Even though cast-iron rotors performed in an adequate manner, the improvements in materials technology has brought about a resurgence of the aluminum-based rotor since the weight of a typical cast-iron rotor is about 10.0 pounds or 4.5 Kg while the weight of a comparable Al-MMC rotor is 3.8 pounds or 1.7 Kg.

During our evaluation of various compatible formulations for friction pads for use in a brake system having Al-MMC rotors, it was discovered that once an Al-MMC rotor was subjected to operational temperatures that exceeded 450° C., hot spots were created and portions of the rotor rubbing surface (RRS) disrupted and were deposited on a cooler portion of the RRS giving the appearance of immediate RRS scoring, which in turn scored the friction material pad rubbing surface.

In an effort to develop more effective low cost and lightweight compatible friction pads and rotors for brake systems, both friction pads and rotors have been evaluated. One of the early attempts to improve friction stability in a brake system was through the development of a copper-based rotor and compatible friction pads as disclosed in U.S. Pat. No. 3,972,394. While this friction pair performed in an adequate manner with respect to friction and wear performance, the weight of the resulting copper-based rotor was actually more than a comparable cast-iron rotor. Later development in rotors identified various alloys, such as iron and silicon carbide and copper chromium. The thickness of rotors made from copper chromium were thinner than the other material in an attempt reduce the total weight of a brake system while achieving desired braking requirement. However, higher temperatures resulted due to the reduction in adequate heat capacity and as a result such rotors have not been accepted as a substitute for existing cast iron rotor.

Initial evaluation of several friction material formulations of friction pads for use with Al-MMC rotors was based on formula used with cast iron rotors. However, even after modification of such formula through the elimination of metal powders while increasing the elastomeric ingredients, the resulting friction pads were not acceptable since the average coefficient of friction was too low and unstable to meet the desired braking requirements, and the remaining abrasive ingredients in the formula often scored the aluminum rotors.

After many tests it was discovered that the addition of 10–18 percent by weight of porous copper powder having a nominal diameter of less than 0.40 mm and preferably less than 0.20 mm would aid in the formation of a glaze on the Al-MMC rotor to maintain a stable coefficient of friction while avoiding scoring of the Al-MMC rotor at operational temperatures that approach 280° C.

An advantage of the present composition for a friction pad is in its compatibility with aluminum and aluminum alloy, specifically Al-MMC, rotors giving a high and stable friction coefficient with low wear with operating rotor temperatures up to 450° C. and pad surface temperatures that approach 350° C.

It is an object of this invention to provide a formulation for a family of composition of material for use in friction pads which are compatible with Al-MMC rotors.

These objects and advantages should be apparent from reading this specification while viewing the drawings wherein.

In automotive brake systems, either an organic (non-asbestos) or semimetallic formulation is selected to manufacture a friction pad for use with a cast iron rotor in a brake system. Non-asbestos friction material formulations typically include metal powders, friction modifiers, elastomeric particles, carbonaceous materials, and glass fiber held in an organic resin matrix while semimetallic formulations contains a higher amount of metals and graphites, friction modifiers, elastomeric particles, and an organic resin matrix.

During the development of a friction pad to the improved the operational characteristics of a friction coupling, a desired base line was established to initially evaluate the coefficient of friction for various formulation of materials. After an initial formula was identified, the coefficient of friction and wear of commercial friction pads as determined through an SAE D-212 test with a cast iron rotor was used as a baseline to evaluate the selected formula as a friction pads for use with an Al-MMC rotor. The average coefficient of friction for such a desired initial base line is shown by curve 100 in FIGS. 3a, 4a, 5a, 6a, 7a, 7c, and 8a.

The operational temperature generated through the engagement of friction pads and cast-iron rotors which may exceed 480° C. can result in a degradation of the rubbing surfaces which is evidenced by a loss of protective rubbing surface glaze, a reduction of the coefficient of friction, and a dramatic increase in wear. However, once the friction pads and cast iron rotor cool to ambient temperature a protective rubbing surface glaze reforms, the wear is reduced, and the coefficient of friction returns to an expected level. In the development of the invention disclosed herein, a commercial automobile front disc brake for a brake system of a compact automobile was used to evaluate frictional formulations for use in friction pad/Al-MMC rotor friction couples. Inertia from a wheel load of 1020 lbs was used to simulated the braking energy for the brake system of such a compact automobile. The volume of a cast-iron rotor for the compact automobile was used to prepare a pattern to make sand casts and a molten slurry of aluminum alloy and silicon carbide particulate was poured into such sand casts to create Al-MMC castings. The Al-MMC castings were machined with diamond tools to produce ventilated rotors that were 234 mm in diameter with 24.0 mm thick rubbing surfaces.

In the initial investigation of a compatible friction pad and an Al-MMC rotor, good compatibility was repeatedly demonstrated during normal brake operation through 850F/445C, as measured at the rubbing surfaces. Above this temperature, we experienced what was termed poor compatibility leading to deterioration of the friction couple compatibility. Investigation indicated that this failure occurred during a braking application when the operating temperature reached and exceeded 450° C. It was observed that as the temperature of the rotor rubbing surface approached 450° C. certain hot spots on the rotor rubbing surface or just below the glaze softened and portions of the rotor rubbing surface actually became weaker. During this weakening, the tangential force of the weakened hot spots on the rotor going past the friction pads causes the hottest wear track on one or both of the rotor rubbing surface's to be disrupted, and then re-solidify on a cooler portion of the rubbing surface on the Al-MMC rotor. This resolidification caused one or more surface projections or a macro-asperities to form on the rotor rubbing surface. These surface projections which are made up of hardened aluminum alloy material and SiC abrasive particles acts as a grinding wheel to immediately cut and grind away the rubbing surface on the friction pads and eliminate its protective glaze. This type of deterioration which is extremely fast always occurs near the end of the stop when the rotor rubbing surface temperature increases through its peak of approximately 450° C. Thus, while a friction pad may perform in an adequate manner up to 440° C. at the rubbing surface on an Al-MMC rotor, unlike a cast iron rotor once the operational temperature exceed 450° C. accelerated failure of the friction couple occurs.

Figure 1:
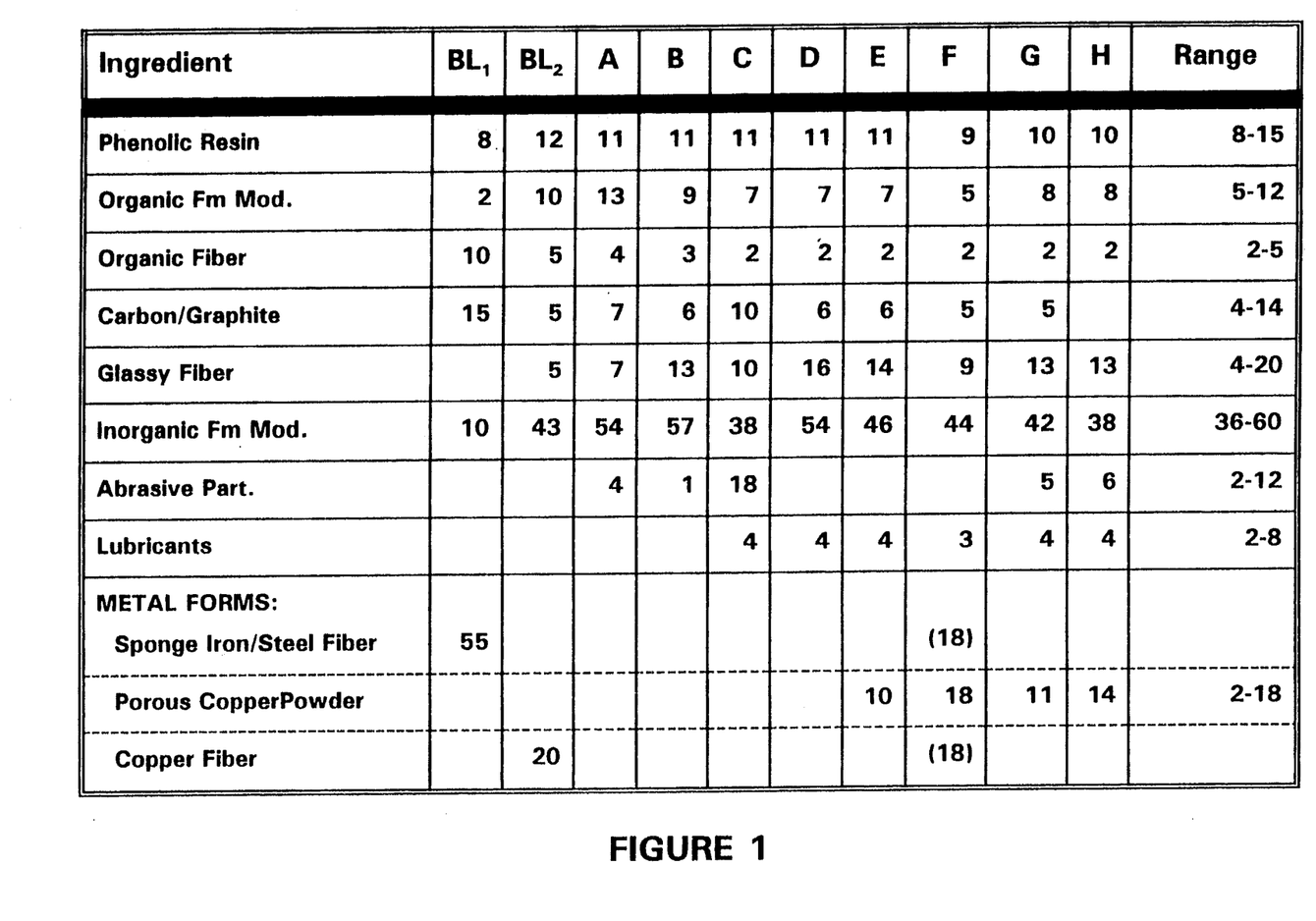
FIG. 1 is a table listing ingredients of various formulations for the friction pads that were evaluated during the development of the present invention.
Figure 3A:
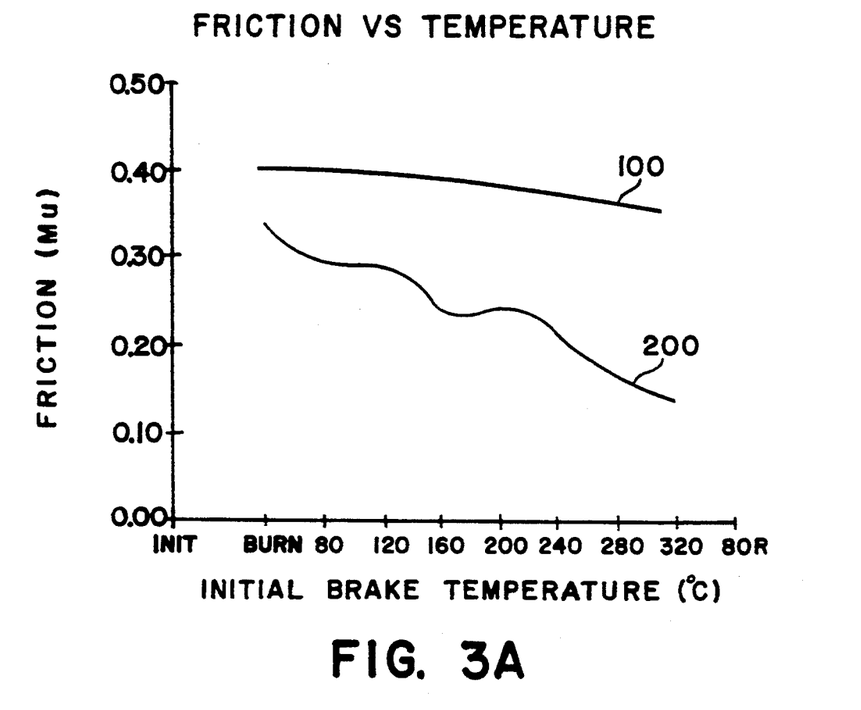
FIG. 3a is a graph of the coefficient of friction versus temperature for Composition A, as determined by initial screening done on an inertial dynamometer using a Schedule 112 Friction versus Temperature Procedure.
Figure 3B:
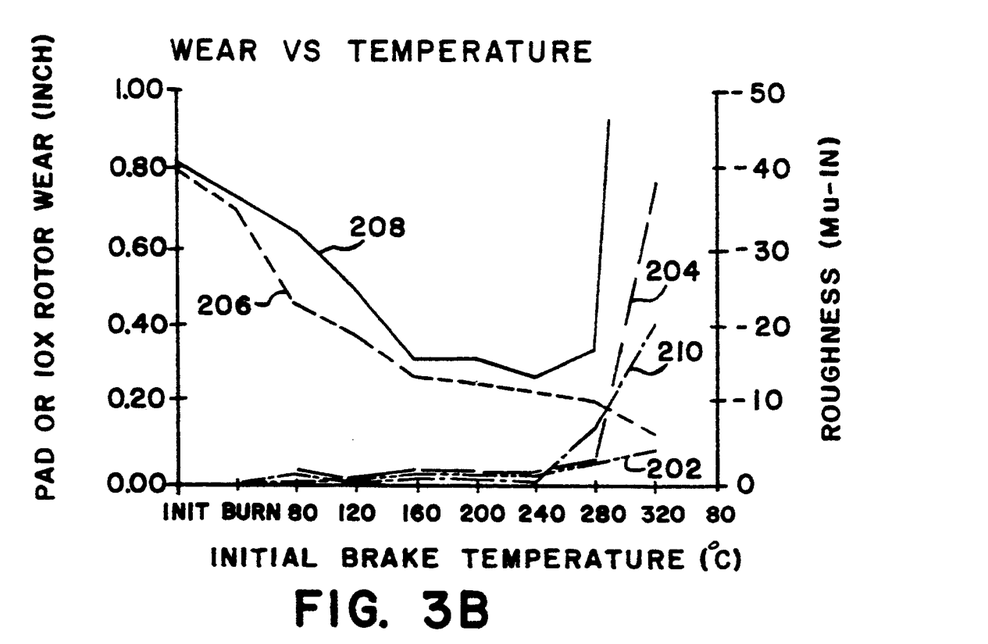
FIG. 3b is a graph of pad and rotor wear versus temperature for Composition A, as determined by initial screening done on an inertial dynamometer using a Schedule 112 Wear versus Temperature Procedure.
Figure 4A:
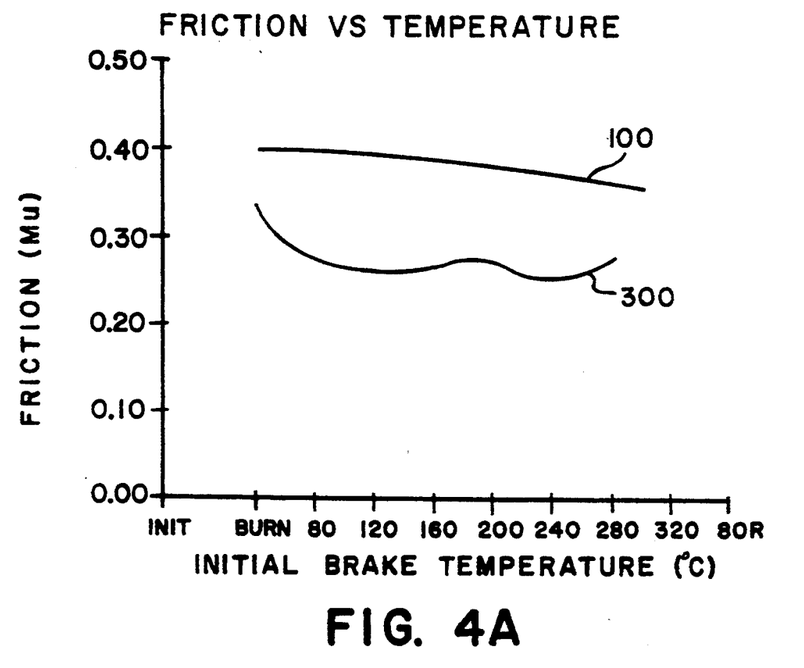
FIG. 4a is a graph of the coefficient of friction versus temperature for Composition B, derived from information obtained from an inertial dynamometer using a Schedule 112 Friction versus Temperature Procedure.
Figure 4B:
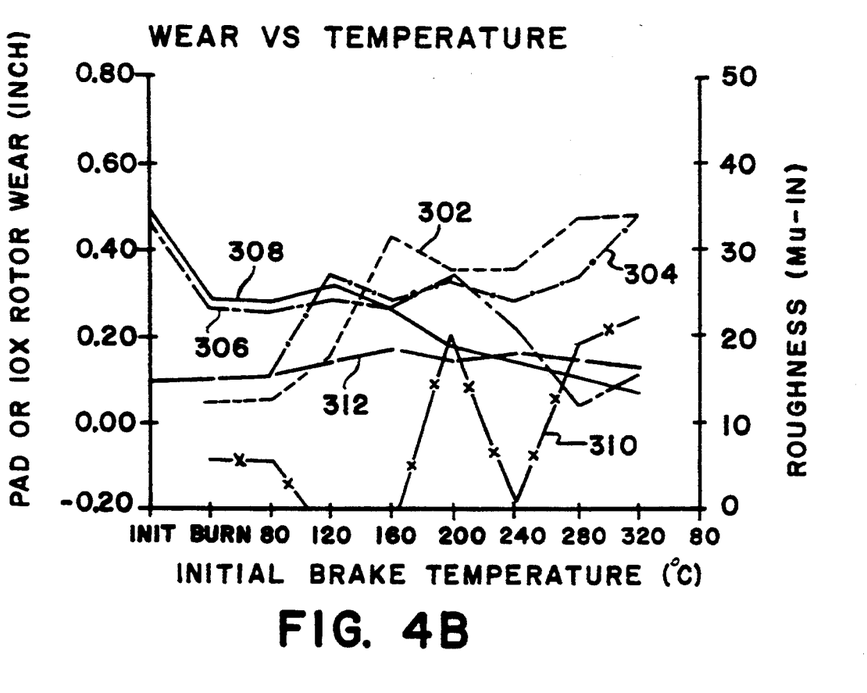
FIG. 4b is a graph of pad and rotor wear versus temperature for Composition B, derived from information obtained from an inertial dynamometer using a Schedule 112 Wear versus Temperature Procedure.

It was known that copper and iron based materials typically used in friction formulations are incompatible with the rubbing surfaces on Al-MMC rotors. Based on previous experiences and experiments it was known that the rapid degradation due to incompatibility of semimetallic friction formulations and Class B non-asbestos based friction formulations typical of Europe and Japan occur with aluminum-based rotor materials. Therefore, it was decided to eliminate all metal powder in the evaluation of formulations for friction pads and Al-MMC rotors. Composition A illustrated in FIG. 1 was an initial formulation evaluated as a compatible friction pad for use in a friction coupling a to reduce the possibility of developing undesirable rapid degradation. It should be noted that the organic Friction Modifier of Composition A could be selected from rubber scrap, cellulose, latex, cork, and/or CNSL particles (polymerized cashew nut shell liquid). The rubber scrap which was selected makes up 13 percent by weight of the total composition and is at least twenty five percent greater than a typical organic based formula, but was considered necessary to assure the development of a glaze on engagement with the rubbing surfaces of the Al-MMC rotor to provide friction stability. Friction pads were constructed from Composition A and tested with an Al-MMC rotor, which included 20 percent silicon carbide, on an inertial dynamometer using a Schedule 112 procedure. Information obtained from an inertial dynamometer, which is sufficient for an initial evaluation of a new composition such as Composition A, was used to derive a coefficient of friction as shown by curve 200 in FIG. 3a; plus a determination of a wear rate for the inner pad and outer pad, inner and outer rotor surfaces roughness values, and rotor wear as illustrated by curves 202, 204, 206, 208 and 210, respectively, in FIG. 3b. When compared with the desirable optimum coefficient of friction as illustrated by curve 100 in FIG. 3a and uniform wear over the operating temperature range in a brake system, it should be evident that while Composition A is somewhat compatible with an aluminum rotor with respect to acceptable wear without scoring, however, the coefficient of friction is lower than required and the wear resistance above 280° C. for the total system was less than desirable.

lit order to increase the coefficient of friction and to improve the wear resistance, it was suggested that the formulation of Composition A could be modified through an increase in glassy fiber to produce Composition B illustrated in FIG. 1. Friction pads were constructed from Composition B and tested with the Al-MMC rotor according to Schedule 112 on the inertial dynamometer. Information obtained from the inertial dynamometer was used to derive the a coefficient of friction as shown by curve 300 in FIG. 4a and a wear rate for the inner Dad and outer pad, inner and outer rotor surfaces roughness by curves 302, 304, 306, 308 and 310, respectively, in FIG. 4a. Also included is the total rotor thickness trend as indicated by 312. When compared with the coefficient of friction and wear for Composition A and the desired coefficient of friction illustrated by curve 100 and uniform wear, it should be evident that while Composition B produced an increase in the coefficient of friction and wear resistance at a higher temperature, the coefficient of friction decreased with temperature and undesirable friction pad to rotor transfer occurred on the rubbing surface of the Al-MMC rotor.

Figure 5A:
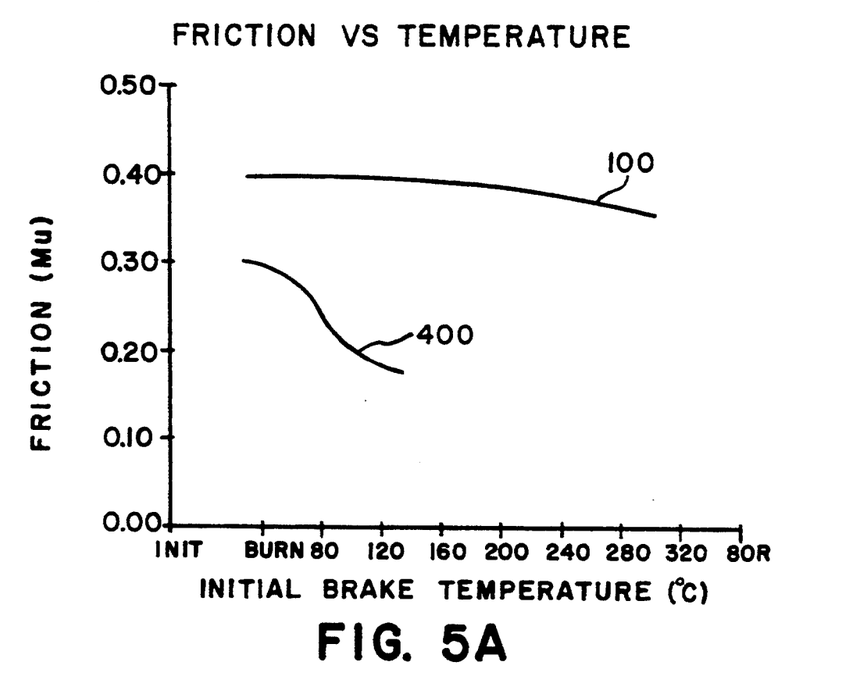
FIG. 5a is a graph of the coefficient of friction versus temperature for Composition C, derived from information obtained from an inertial dynamometer using a Schedule 112 Friction versus Temperature Procedure.
Figure 5B:
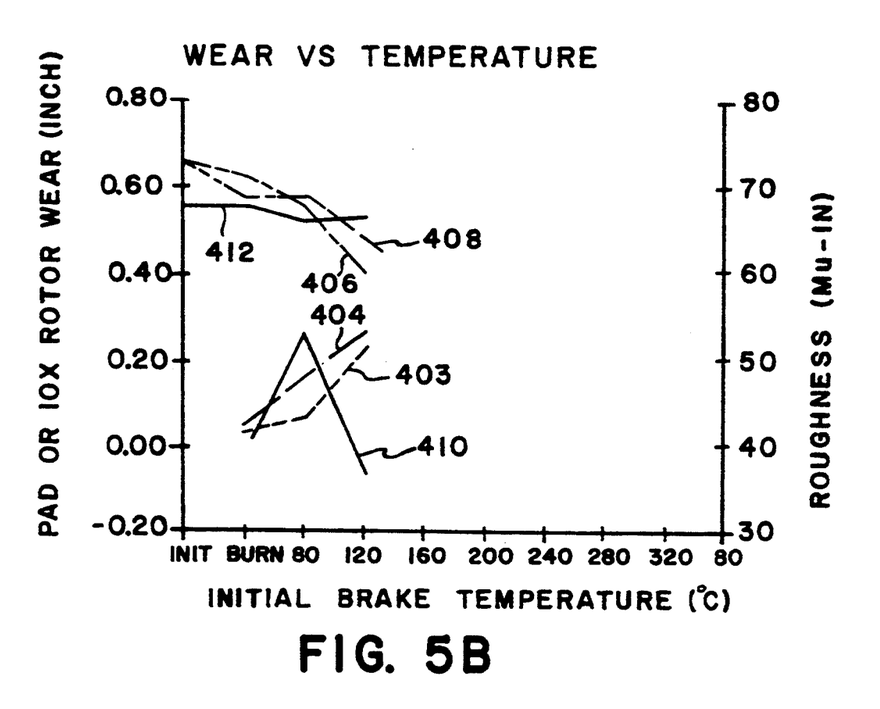
FIG. 5b is a graph of pad and rotor wear versus temperature for Composition C, as determined from information obtained from an inertial dynamometer using a Schedule 112 Wear versus Temperature Procedure.

In an effort to reduce the transfer of friction pad material to the Al-MMC rotor, Composition B was modified through a slight reduction in the glassy fiber content, an increase in the carbonaceous material which includes carbon, graphite and coke, with graphite being the preferred, additional abrasive particle which could be selected from a group consisting of silica, magnesium oxide, zircon, mullite, alumina, magnesia and iron oxide, with iron oxide being selected, and the addition of a lubricant particle which could be selected from a group consisting of molybdenum sulfide, calcium fluoride, antimony trisulfide, and molybdenum disulfide with calcium fluoride being selected to produce Composition C shown in FIG. 1. Friction pads were constructed from Composition C and tested with an Al-MMC rotor in an according to Schedule 112 on the inertial dynamometer. Information obtained from the inertial dynamometer was used to derive the a coefficient of friction as shown by curve 400 in FIG. 5a, and a wear rate for the inner pad and outer pad, inner and outer rotor surfaces roughness by curves 402, 404, 406 and 408 in FIG. 5b. Curves 410 and 412 give the rotor wear and the overall rotor thickness trend. During the testing when the coefficient of friction for Composition C as compared with the optimum base line coefficient of friction curve 100 and wear it was evident that Composition C was not an improvement over Composition A and Composition B as the coefficient of friction decreased with temperature and scoring occurred on the engagement surface of the Al-MMC rotor even with the addition the lubricant, therefore the entire procedure of Schedule 112 was not completed.

Figure 6A:
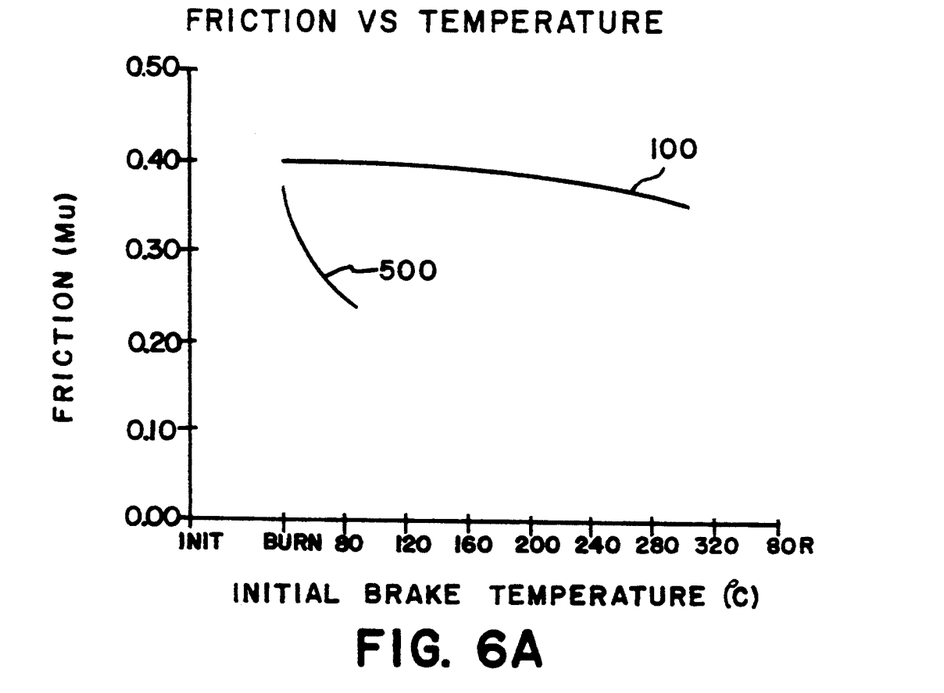
FIG. 6a is a graph of the coefficient of friction versus temperature for Composition D, derived from information obtained from an inertial dynamometer using a Schedule 112 Friction versus Temperature Procedure.
Figure 6B:
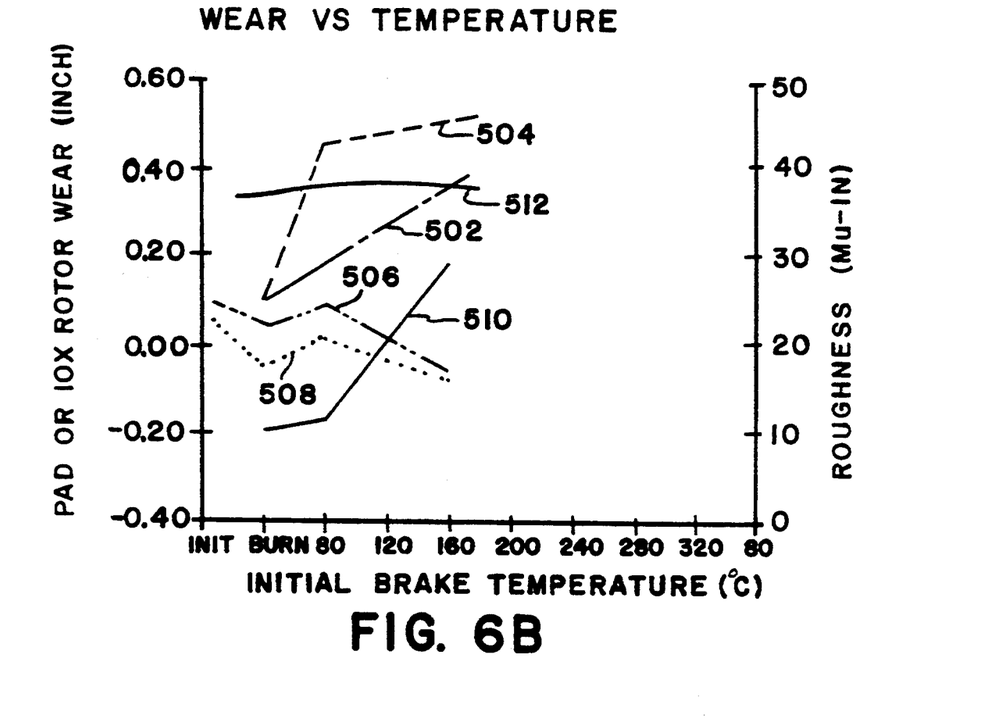
FIG. 6b is a graph of pad and rotor wear versus temperature for Composition D, derived from information obtained from an inertial dynamometer using a Schedule 112 Wear versus Temperature Procedure.

In order to stabilize the coefficient of friction of Composition C and scoring of the rotor surfaces, the metallic oxide abrasive particle therein was removed and the percentage of glass fiber increased over Composition B to provide strength while the inorganic friction modifier which could be selected from a group consisting of barytes, whiting, talc, rottenstone, vermiculite, and suzorite mica, with barytes and suzorite mica, being selected, to produce Composition D shown in FIG. 1. Friction pads were constructed from Composition D and tested with the composite aluminum rotor according to Schedule 112 on the inertial dynamometer. Information obtained from the inertial dynamometer was used to derive the a coefficient of friction as shown by curve 500 in FIG. 6a and a wear rate for the inner pad and outer pad, and inner and outer rotor surfaces roughness as illustrated by curves 502, 504, 506 and 508 in FIG. 6b. Curves 510 and 512 give rotor wear and the overall rotor thickness trends. When compared with the optimum desired coefficient of friction illustrated by curve 100 and wear, it should be evident that while Composition D produced an acceptable initial or burnish coefficient of friction, the coefficient deceased and some pad to rotor transfer still occurred on the engagement surface of the Al-MMC rotor even with the lubricant.

Figure 2A:
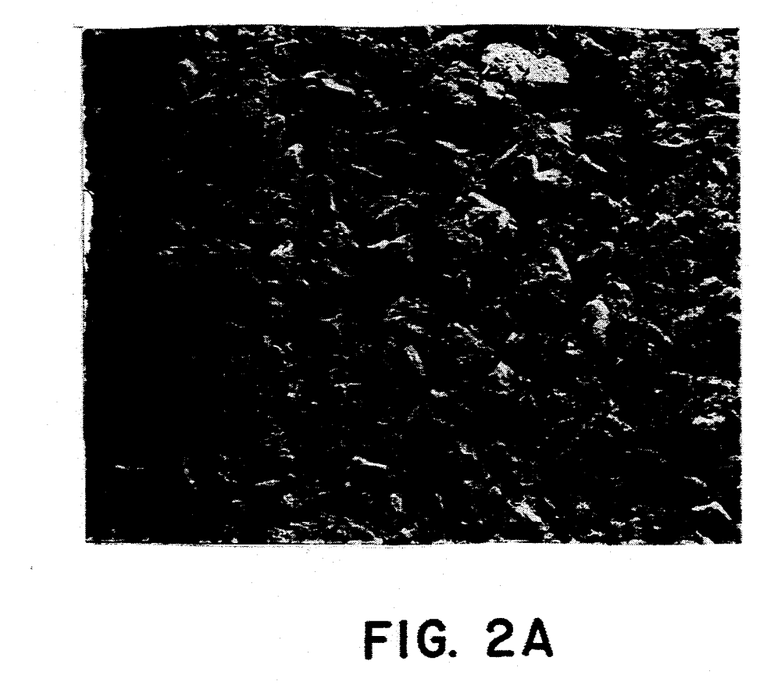
FIGS. 2a is a photomicrograph (200×) of a preferred porous copper powder for use in the formulation of a composition of material for the friction pads according to the present invention.
Figure 2B:
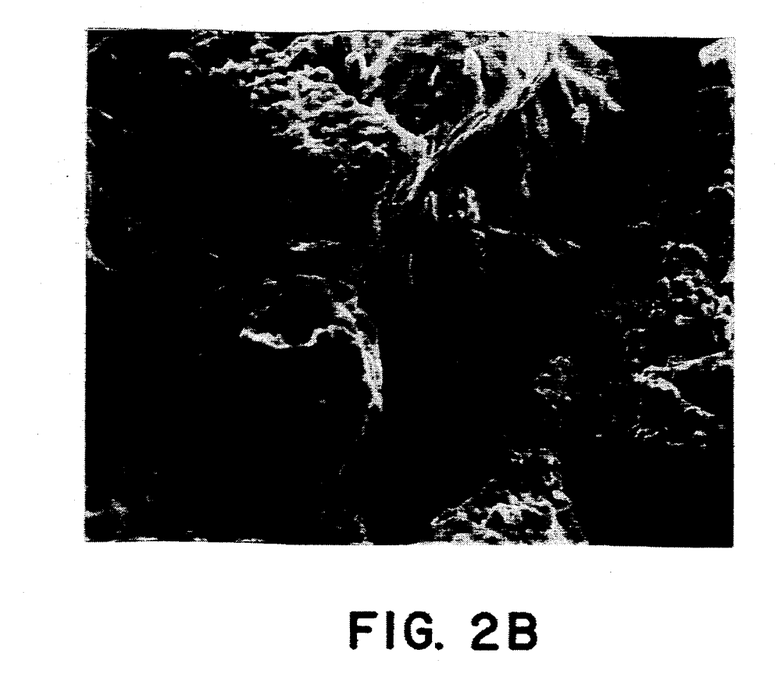
FIGS. 2b is an enlarged photomicrograph (1000×) of the preferred porous copper powder of FIG. 2a showing a rough surface and a somewhat porous interior for the individual grains.

In a further effort to provide for a high and stable coefficient of friction Composition D was modified through the addition a porous copper powder for some of the inorganic friction modifiers to produce Composition E shown in FIG. 1. The porous copper powder, which had a nominal −150 mesh size, an apparent density of 2.7 and inherent irregular shape, as shown in FIG. 2a and 2b, was selected to assist in the formation of the glaze on the rubbing surfaces, reduce wear and aid in the transfer of thermal energy from the engagement surfaces to the surrounding environment to maintain the operational temperature of the coupling below 450° C. In order to assure that porous copper powder was distributed over more of the rubbing surface and that a reaction occurs through the operating temperature sufficient to create the desired formation of the glaze on the aluminum surface, the nominal size of the porous copper powder was defined to be less that 0.040 mm in diameter with at least 55–71 percent less that 0.10 mm. Friction pads were constructed from Composition E and tested with the composite aluminum rotor according to Schedule 112 on the inertial dynamometer. Information obtained from the inertial dynamometer was used to derive the a coefficient of friction as shown by curve 600 in FIG. 7a and a wear rate for the inner pad and outer pad, and inner and outer rotor surface roughness as illustrated by curves 602, 604, 606 and 608 in FIG. 7b. Curves 610 and 612 give rotor wear and overall rotor thickness trends. Widen compared with the desired optimum coefficient of friction illustrated by curve 100 and wear and the coefficient of friction for Compositions A, B, C and D, it should be evident that while Composition E produced an acceptable stable coefficient of friction which is slightly less than the desired optimum, acceptable wear resistance and good glazing without unacceptable noise during the Schedule 112 procedure occurred. The relatively soft and malleable features of the porous copper powder presented a very mild metallic surface and essentially non-abrasive surface to the Al-MMC rotor rubbing surfaces, which in turn does not cause intermetallic joining and pull-out, rather a good smearing of the pad reaction products over the Al-MMC rotor rubbing surfaces which leads to a protective glaze formation conducive with a high and stable friction and excellent compatibility leading to desirable wear resistance. In order to confirm the acceptability of Composition E, a second test was perforated using an Al-MMC rotor from a second manufacturer containing a higher SiC content(30% vs 20%). The results of the second test given as FIGS. 7c and 7d were substantially identical with the first test with a slightly higher and stable initial friction level at 160° C. followed by less decrease through 320° C. Thus, the second test provided additional evidence that Composition E possessed a combination of desired characteristics that approached the optimum coefficient of friction with uniform and predictable wear.

Figure 7A:
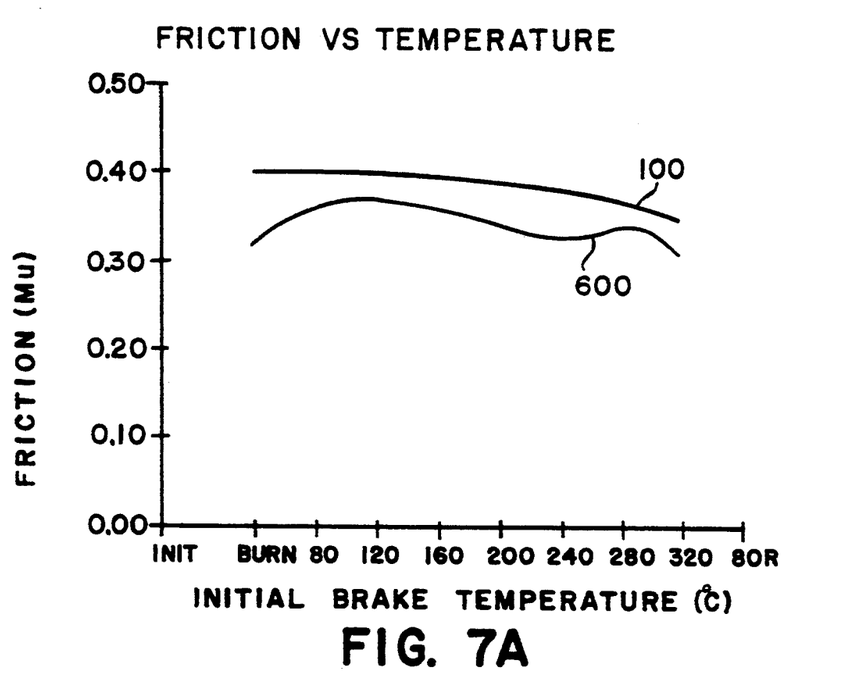
FIG. 7a is a graph of the coefficient of friction versus temperature for Composition E, derived from information obtained from an inertial dynamometer using a Schedule 112 Friction versus Temperature Procedure for an aluminum alloy rotor which included 20% SiC.
Figure 7B:
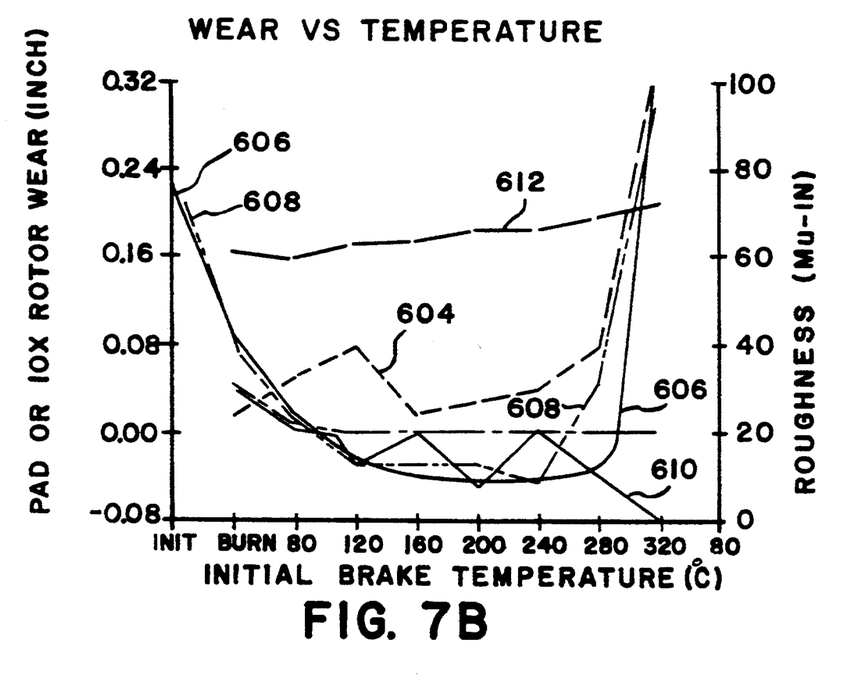
FIG. 7b is a graph of pad and rotor wear versus temperature for Composition E, derived from information obtained from an inertial dynamometer using a Schedule 112 Wear versus Temperature Procedure for an aluminum alloy rotor which included 20% SiC; is a graph showing wear and coefficient of friction versus temperature for Composition E with a rotor made with 20% SiC.
Figure 7C:
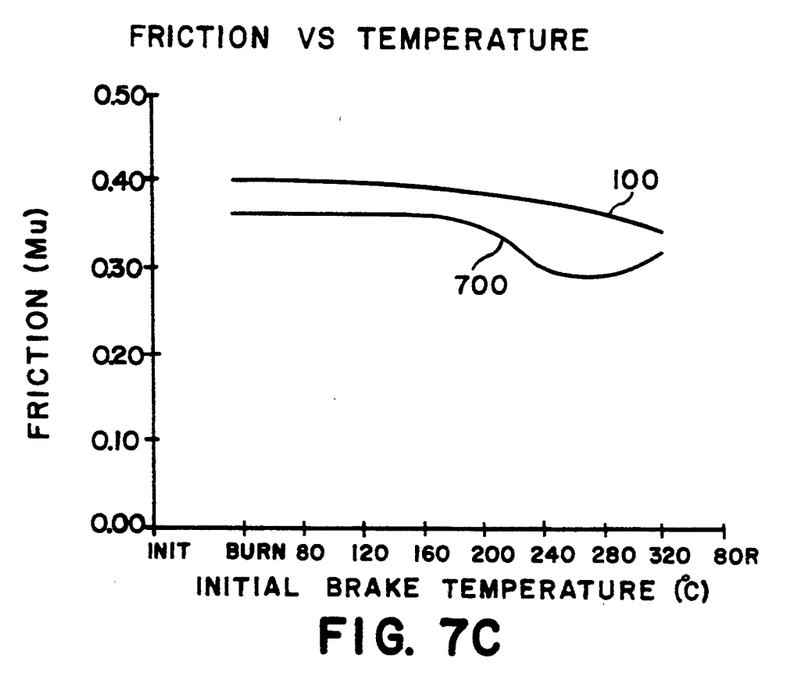
FIG. 7c is a graph of the coefficient of friction versus temperature for Composition F, derived from information obtained from an inertial dynamometer using a Schedule 112 Friction versus Temperature Procedure.
Figure 7D:
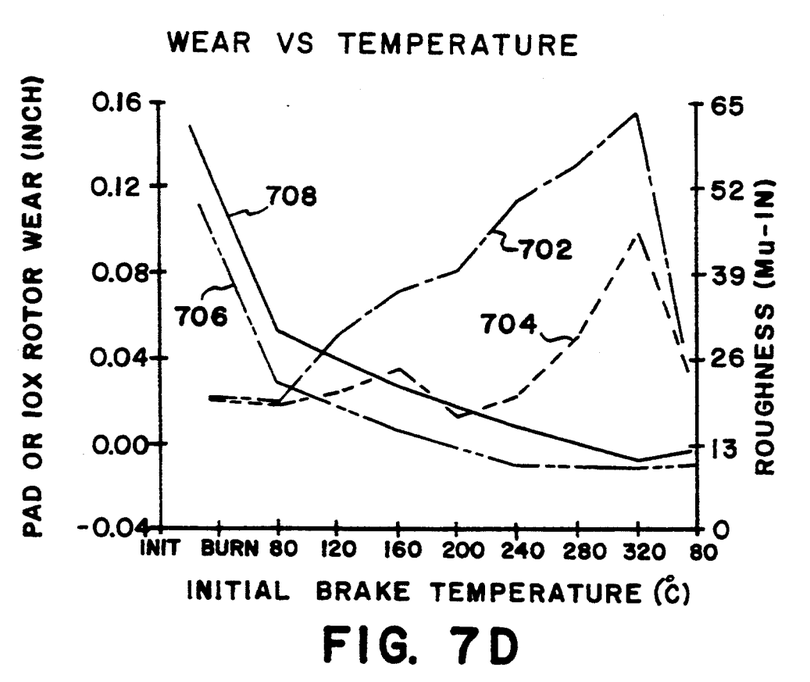
FIG. 7d is a graph of pad and rotor wear versus temperature for Composition F, derived from information obtained from an inertial dynamometer using a Schedule 112 Wear versus Temperature Procedure.

To further evaluate the effect of porous copper powder on the operational characteristics of friction pads, the amount of the porous copper powder in Composition E was increased and the glassy fiber reduced to produce Composition F shown in FIG. 1. Friction pads were constructed from Composition F and tested with the composite aluminum rotor according to Schedule 112 on the inertial dynamometer. Information obtained from the inertial dynamometer was used to derive the a coefficient of friction as shown by curve 600 in FIG. 7a and a wear rate for the inner pad and outer pad, illustrated by curves 602 and 604 in FIG. 7b. As illustrated in FIG. 7a, the coefficient of friction is satisfactory, however, some pad-to-rotor material transfer was observed and therefore it was determined that an upper limit for the porous copper powder in a formulation is about 18 percent to prevent material transfer while maintaining stable and uniform wear with a preferred amount to be about 14 percent.

As a result of the performance characteristics of Composition F, several metal variations (steel, copper and brass fibers) were evaluated in place of the porous copper metal powder. Friction pads were constructed similar to Composition F but with copper fiber and brass fiber and tested with an composite aluminum rotor according to Schedule 112. Neither copper fiber or brass fiber provided any friction or wear improvements and actually gave a slightly poorer compatibility at the upper limit as compared with Composition F whereas the use of steel fiber resulted in scoring of the aluminum rotor. These test indicated that contact of essentially any concentration of a dense metal with the rubbing surface would not produce deformation or smearing comparably to fine porous copper powder and as a result detracted from the extended wear performance of the friction pad.

Figure 8A:
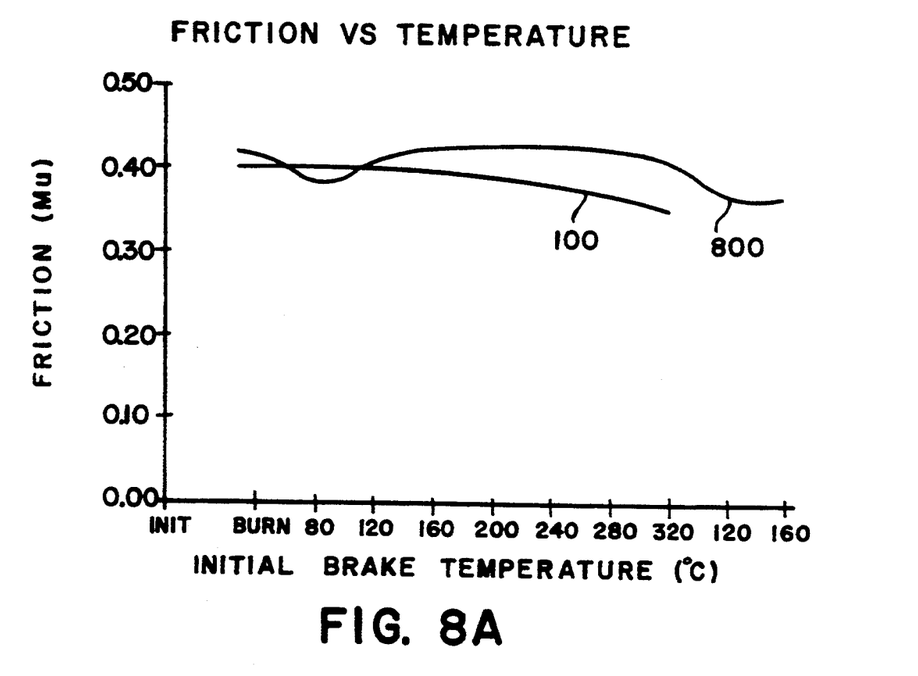
FIG. 8a is a graph of the coefficient of friction versus temperature for Composition G, derived from information obtained from an inertial dynamometer using a Schedule 112 Friction versus Temperature Procedure.
Figure 8B:
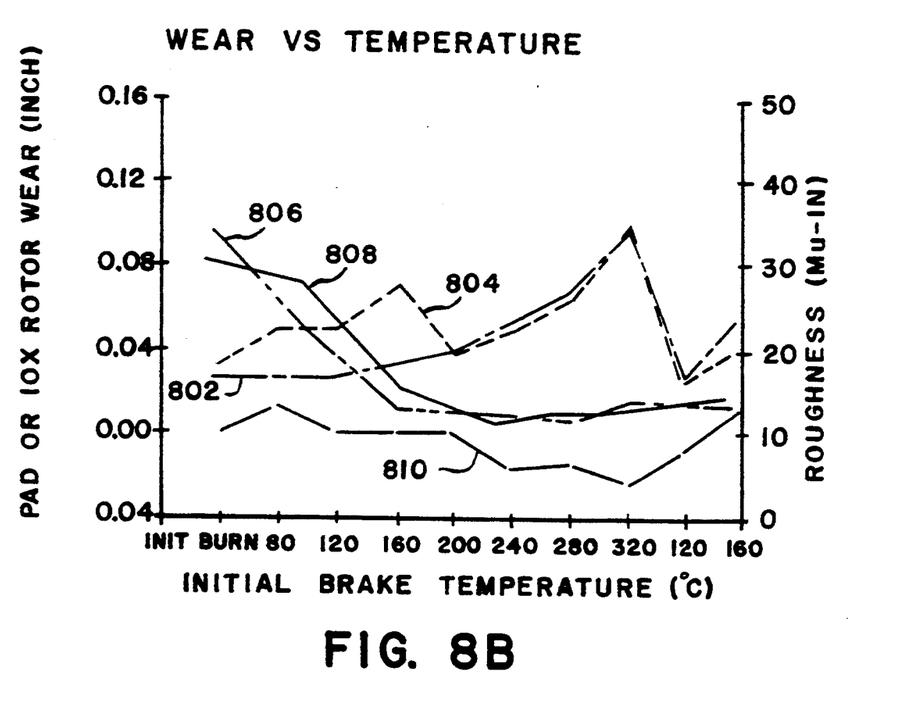
FIG. 8b is a graph of pad and rotor wear versus temperature for Composition G, derived from information obtained from an inertial dynamometer using a Schedule 112 Wear versus Temperature Procedure.

It was observed that the level of the coefficient of friction of Composition E as shown in FIG. 7a is slightly less that the optimum desired optimum coefficient of friction as illustrated by curve 100 and under some circumstances may not meet all braking requirements. In order to increase the initial coefficient of friction of Composition E to approximately 0.39 comparable with the desired optimum coefficient of friction illustrated by curve 100, it was decided to add an abrasive silicon and alumina combination to the formulation while reducing the amounts of porous copper powder and suzorite mica which were replaced with a corresponding increase in the glassy fiber and adding an organic friction modifier (cashew-nut shell liquid) to produce Composition G in FIG. 1. Friction pads were constructed from Composition G and tested with the composite aluminum rotor according to Schedule 112 on the inertial dynamometer. Information obtained from the inertial dynamometer was used to derive the a coefficient of friction as shown by curve 800 in FIG. 8a and a wear rate for the inner pad and outer pad, and inner and outer rotor surfaces roughness by curves 802, 804, 806 and 808 in FIG. 8b. Curve 810 gives the rotor wear. When compared with the base line coefficient of friction illustrated by curve 100 and wear it should be evident that Composition G produced a stable coefficient of friction and wear that approximates the baseline. These initial evaluations of Composition G indicated a compatible formulation for friction pads against an Al-MMC rotor.

Figure 9:
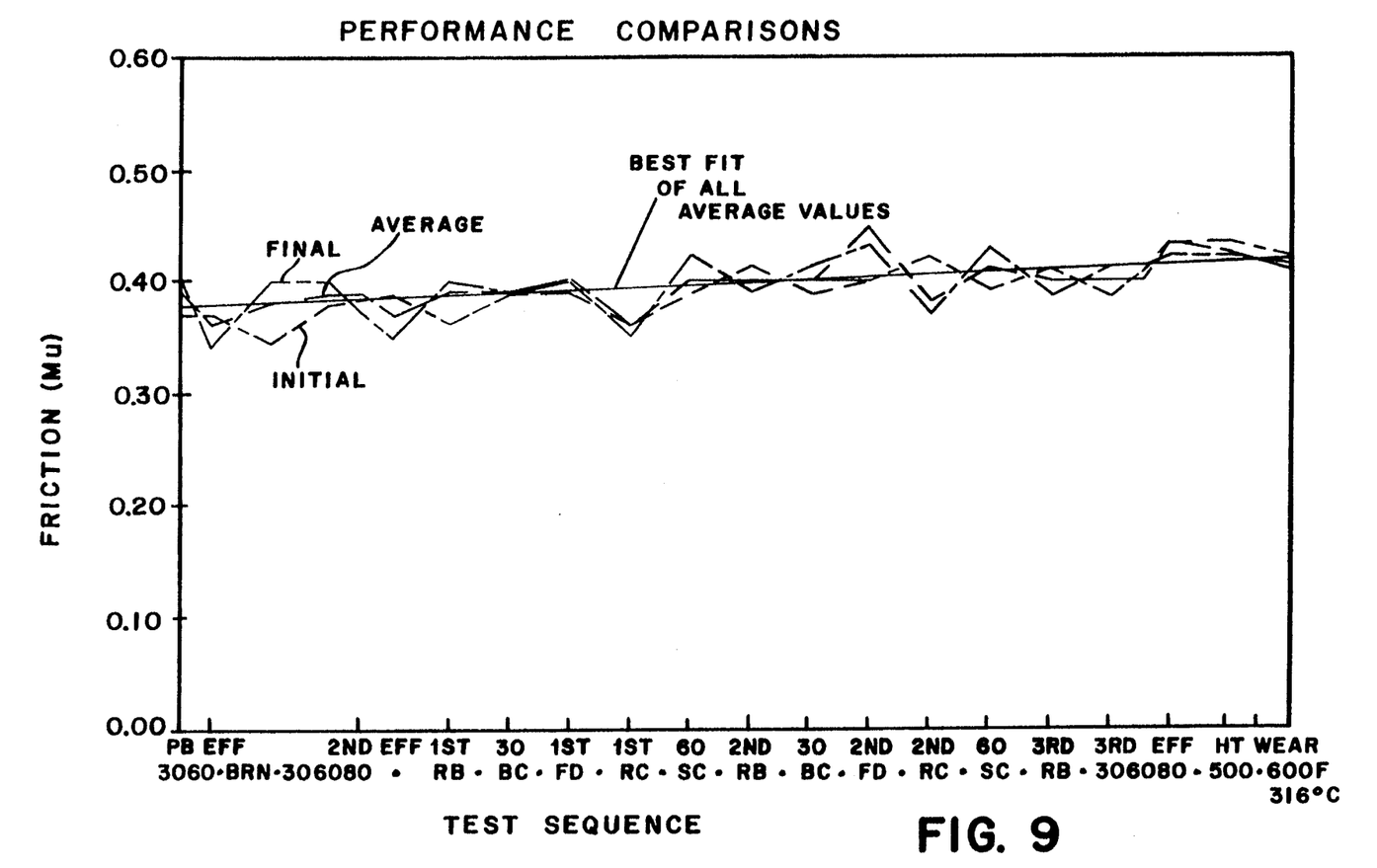
FIG. 9 is a graph showing performance during effectiveness and fade tests for Composition H derived from modified SAE D212 procedure.

Thereafter, minor modification in the chemistry of the ingredients of Composition G were made through an increase in the porous copper powder to create an optimum combination of porous copper powder, abrasive content, and an inorganic friction modifier package which is identified as Composition H in FIG. 1. At this time it was decided to change from the Schedule 112 initial materials development procedure to minor variations of the SAE D-212 procedure which is accepted in the industry as evidence of acceptable performance for friction pads. FIG. 9 illustrates information obtained from SAE D-212 friction test sequence for Composition H which includes the following test conditions: preburnish effectiveness at varying deceleration rates from 30 and 60 mph; 200 burnish stops from 40 mph at 12 feet per second per second; post-burnish or second effectiveness stops from 30, 60, and 80 mph; a reburnish of 35 stops; baseline stops from 30 mph; 10 stop fade from 60 mph at 15 feet per second per second deceleration at 35 second intervals between stops where the temperature rises rapidly, followed by a recovery sequence consisting of 30 mph stops and 120 second intervals between stops; baseline checks from 60 mph; a second reburnish; a second series baseline stops, a 15 stop fade and recovery portion, and the baseline checks; a third reburnish, and a third effectiveness (equivalent to the second). To screen the friction material wear resistance, we added a high temperature procedure with 50 stops made with the brake temperature beginning at 500° F. (260° C.) followed by 50 stops with the brake temperature at 600° F. (316° C.). During this last sequence, the brake rotor increased in temperature by nominally 170° F. (76° C.)so that the final temperature was near 770° F. (410° C.). The temperature of the friction material pads at the rubbing surfaces was near 600° F. (316° C.) at the end of this test.

Figure 10:
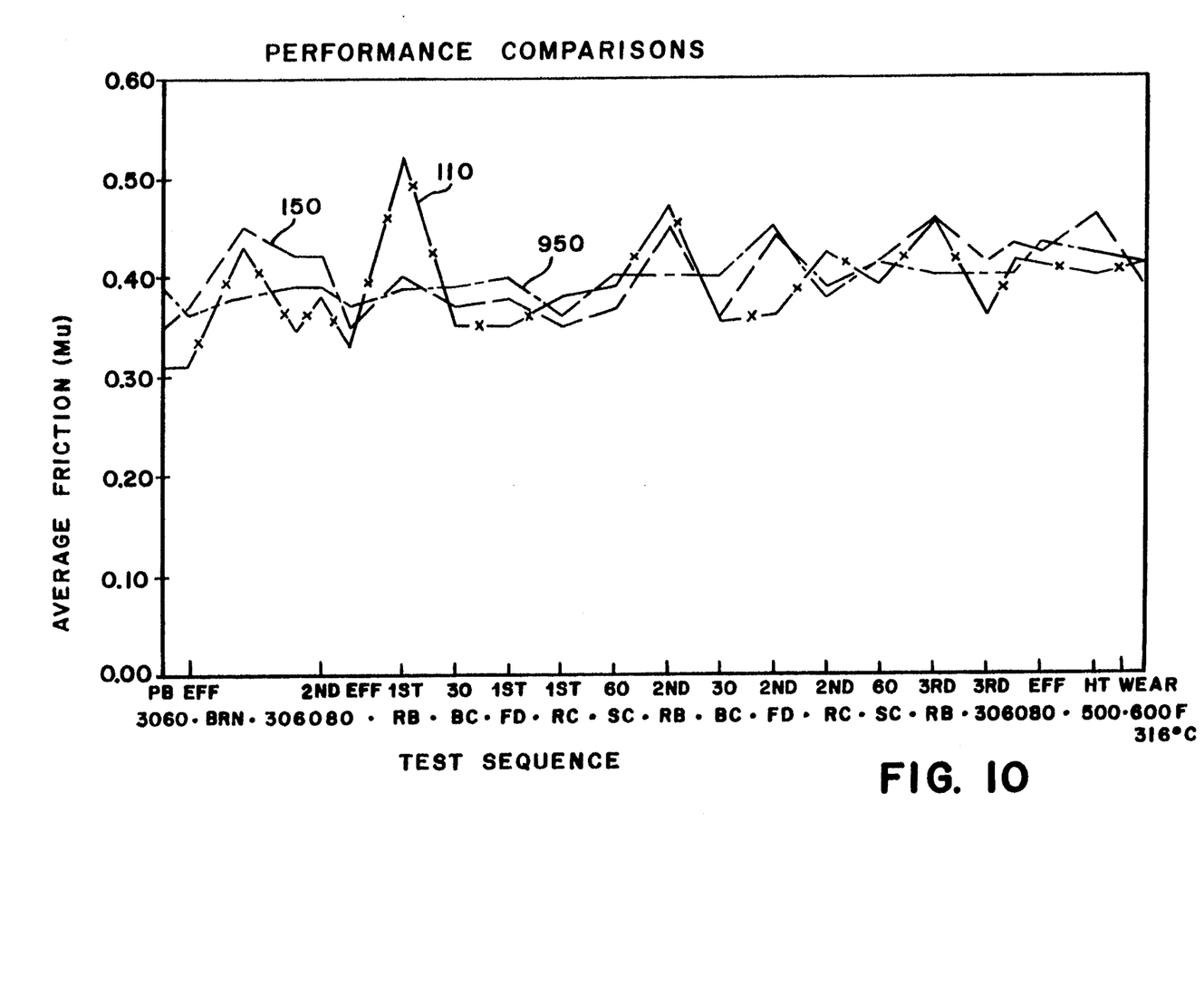
FIG. 10 is a graph comparing the coefficient of friction for Composition H with an organic and a semimetallic friction material.

In order to evaluate the operational characteristics of friction pads wherein the formulations include porous copper powder, SAE D-212 tests were performed on the following friction couples: Curve 950, in FIG. 10, illustrates the results of friction pads made from Composition H run with the lightweight Al-MMC rotor; curve 120, in FIG. 10, illustrates the results of friction pads made from a known semimetallic material formulation, identified in FIG. 1 as baseline 1, run with a cast-iron rotor; and curve 150, in FIG. 10, illustrates the results of friction pads made from a non-asbestos organic material formulation, identified in FIG. 1 as baseline 2, run with a cast-iron rotor. As shown in FIG. 10, for baseline material 1, the preburnish coefficient of friction was near 0.32 but thereafter exhibited a variation which approached 0.52 in the reburnish portion of the test procedure. In addition, it was observed that baseline 1 material showed poor rotor compatibility and severe sparking during the fade and recovery portions of the test procedure. As shown in FIG. 10, baseline 2 material, exhibited an initial coefficient of friction near 0.35 and although the coefficient of friction varied up to 0.45 during the burnish it was more stable than baseline 1 under the same conditions. FIG. 10 illustrates that the friction pads made from Composition H developed the highest preburnish friction, the better friction stability overall and in addition it was observed the during the test procedure Composition H friction pads created the least amount of brake noise when run without noise insulators. In conclusion, it has been demonstrated through the SAE 212 test procedure that friction pads made from formulations that include porous copper powder as in Composition H produced a stable coefficient of friction and compatibility for both friction pads and the Al-MMC rotor.

From our investigations, studies and testing of Compositions A–H, we derived the following limitations with respect to ingredients in a composition of materials to produce an optimum compatible friction pad for use with an Al-MMC rotor:

1. A preferred range of the ingredients for a friction pad is as follows:
   8–15 percent by weight of phenolic resin is sufficient to provide a matrix for holding the ingredients in the composition;
   5–15 percent by weight of organic friction modifiers such as cashew particles, rubber scrap, and cork in an optimum combination is desirable for glaze formation and to aid in friction stability;
   1–5 percent by weight of aramid fiber is desirable to aid in processing and wear resistance, the lower amount may be used if liquid cashew-nut shell is used as an a friction modifier;
   4–14 percent by weight of carbonaceous material, with natural graphite being preferred, and a range of 2–6 percent by weight of lubricant, with calcium fluoride being preferred, is desirable to provide a solid lubricant to stabilize the coefficient of friction and balance of wear developed in a resulting friction pad during a brake application;
   4–20 percent of glass fiber (or glassy fibers such as processed mineral fiber (PMF), man-made mineral fiber (MMMF), slag, etc. is desirable to provide strength to withstand dynamic loading experienced during a brake application;
   36–60 percent by weight of inorganic friction modifiers (barytes, vermiculite, calcium hydroxide, calcium carbonate, and suzorite mica with suzorite mica and barytes being preferred) is desirable to provide strength, stable friction wear resistance, and thermal stability;
   2–12 percent by weight of abrasive (alumina, silica, magnesia, and other ceramics being preferred) is desirable to develop a high and stable coefficient of friction by the friction pad; and
   2–18 percent by weight of porous copper powder is desirable to create a glaze formation and wear resistance during a frictional engagement or coupling;
2. The particle size of the abrasive and porous copper powder in the resulting friction pad should be less that 0.20 mm and preferably about 0.10 mm to prevent scoring of an Al-MMC rotor and the development of the protective glaze;
3. Composite aluminum-alloy rotors that included silicon carbide in a range of 10 to 60% exhibited greater resistance to scoring and degradation when exposed to temperatures above 450° C.;
4. Inert ceramics and oxides such as magnesia, silica, alumina, ferrous, ferric, and mixed oxides such as mica, vermiculite, and ferro-ferric are preferable for selection as friction modifiers and for their abrasive characteristics because they do not effect the reaction of porous copper powder in the formation of the protective glaze when less than 12 per cent are used in a formulation; and
5. The preferred lubricant material is selected from the fluoride family which includes calcium fluoride and cryolite, since molybdenum sulfide and antimony sulfide may react with aluminum or aluminum-based materials to adversely affect the glaze formation and stability.

The ingredients of materials in the formulation of Compositions E–H for friction pads may best be described as a non-asbestos organic material with a high abrasive content countered with a solid lubricant package and modified by a fine porous copper powder which smears and reacts over the rotor rubbing surfaces temperatures above −40° F. (−40° C.) to create a protective glaze and thereby control wear when coupled with an aluminum-metal matrix composite rotor which is reinforcement by silicon carbide particles in the range from 10 to 60%.

We claim:

1. In a brake system including an aluminum-metal matrix composite rotor, an actuation member, and friction pads wherein the actuation member in response to an operational input moves the friction pads into engagement with the aluminum-metal matrix composite rotor to effect a brake application, the improvement in the formulation of said friction pads to prevent degradation of the aluminum-metal matrix composite rotor while providing an average coefficient of friction of from 0.38–0.42 when an operational temperature of −40° to 450° C. is generated during a brake application, said composition comprising:

- 8–15 percent by weight of phenolic resin for said friction pads;
- 5–12 percent by weight of an organic friction modifier selected from a group consisting of rubber scrap, cellulose, latex, cork, and cashew particles to provide friction stability in the friction pads through the development of a glaze on the surface of the aluminum-metal matrix composite rotor during a brake application;
- 1–5 percent by weight of aramid fiber to aid in the initial processing the composition and to provide resistance to wear for the friction pads;
- 4–14 percent by weight of a carbonaceous material selected from a group consisting of natural graphite, synthetic graphite, carbon and coke;
- 4–20 percent by weight of glass fiber to provide strength for the friction pads;
- 36–60 percent by weight of inorganic friction modifiers selected from a group consisting of barytes, whiting, talc, rottenstone, verrniculite and suzorite mica to provide strength and friction stability for the friction pads;
- 2–12 percent by weight of an abrasive particle selected from a group consisting of silica, magnesia, zircon, zirconia, mullite, alumina, and iron oxides for developing a desired level for the coefficient of friction and a degree of friction stability necessary for the friction pads;
- 2–8 percent by weight of a lubricant material selected from a group consisting of molybdenum sulfide, calcium fluoride, antimony trisulfide, and cryolite; and
- 2–18 percent by weight of porous copper powder, said porous copper powder assisting in the formation of the glaze to reduce wear between the aluminum rotor and friction pads during a brake application.

2. In the brake system as recited in claim 1 wherein said porous copper powder has a nominal diameter of less that 0.40 mm to prevent scoring of the aluminum-metal matrix composite rotor during a brake application.

3. In the brake system as recited in claim 1 wherein said porous copper powder has a nominal diameter of less than 0.10 mm to prevent scoring of the aluminum-metal matrix composite rotor during a brake application.

4. In the brake system as recited in claim 2 wherein said porous copper powder has an density of 2.7 gm/cc.

5. In the brake system as recited in claim 4 wherein the composition of the aluminum-metal matrix composite rotor includes aluminum alloy with an inclusion of silicon carbide in a range of 10 to 60%.

6. In the brake system as recited in claim 4 wherein said the engagement of said friction pads with the aluminum-metal matrix composite rotor does not cause a substantial change in the hardness of the aluminum rotor rubbing surfaces after a series of exposures to temperature above 250° C.

7. In the brake system as recited in claim 1 wherein the density of the friction pad is from 2.3 to 2.6 gm/cc.

* * * * *